Sept. 29, 1953 J. E. FORESTER 2,653,569
ANIMAL CAGE FEEDING DEVICE
Filed Nov. 6, 1950 3 Sheets-Sheet 1

Inventor
JOSEPH E. FORESTER,
By Raymond Wheolten
Attorney

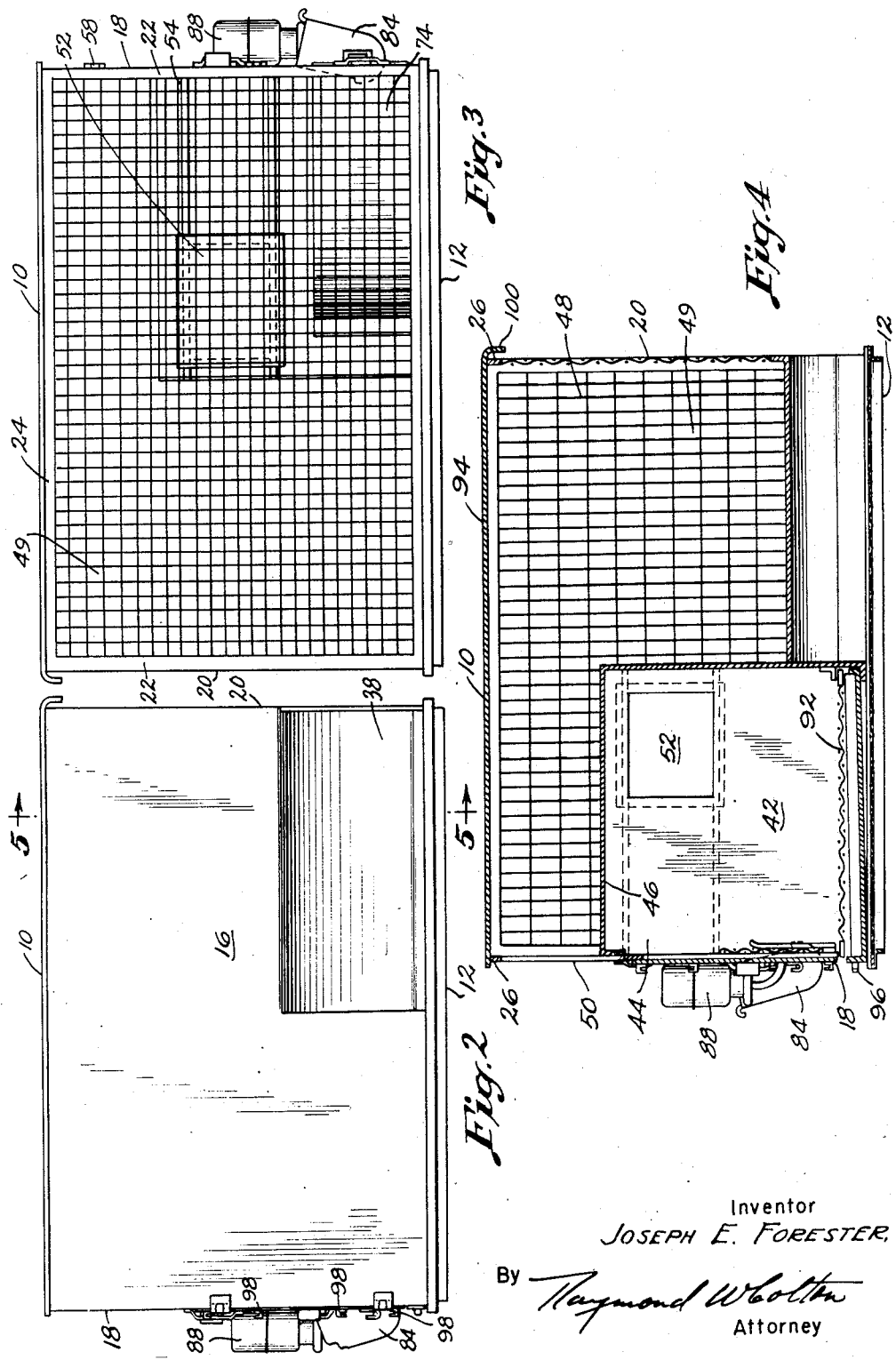

Sept. 29, 1953 J. E. FORESTER 2,653,569
ANIMAL CAGE FEEDING DEVICE
Filed Nov. 6, 1950 3 Sheets-Sheet 3
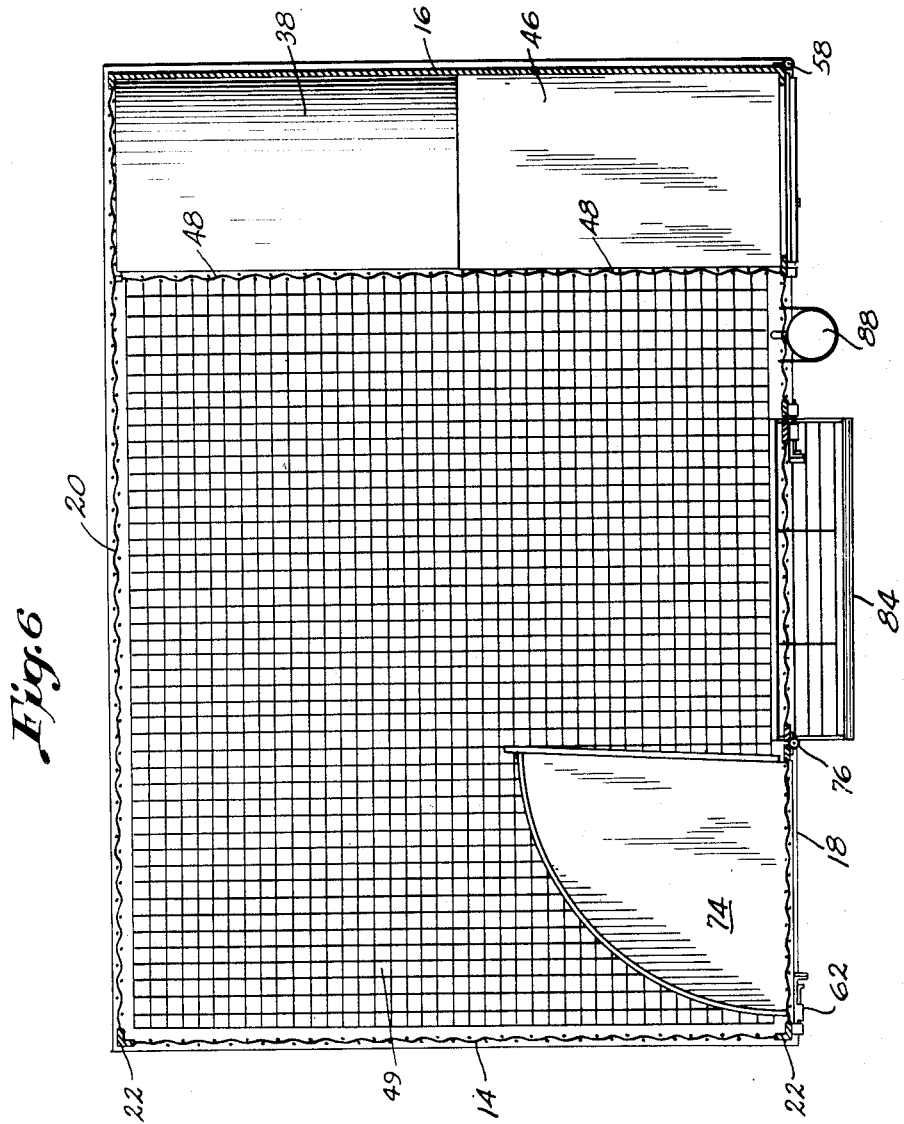
Inventor
JOSEPH E. FORESTER,
By
Attorney Patented Sept. 29, 1953

2,653,569

UNITED STATES PATENT OFFICE 2,653,569

ANIMAL CAGE FEEDING DEVICE

Joseph E. Forester, Arlington, Va.

Application November 6, 1950, Serial No. 194,228

7 Claims. (Cl. 119—18)

This invention relates to animal cages applicable to the breeding and raising of animals of various types, but especially intended for use in conjunction with chinchillas.

Whereas it is desirable to utilize self-feeders for livestock wherever possible, it is also highly desirable from the standpoint of space economy to stack cages one upon the other and to arrange them in contact horizontally as well. With such an arrangement of cages, the problem has arisen as to how self-feeding can be accomplished without obscuring the animals from the front of the cage. There have been many attempts to solve the problem by hanging appendages on the sides of existing cages, but this precludes the desirable close positioning of the cages in side by side relationship. And while it has been satisfactory in the past to mount shallow troughs and receptacles towards the bottom of the front wall of a cage of this type, it is entirely unsatisfactory to arrange self-feeders on the front wall where any appreciable height must be attained. As those familiar with the art are aware, self-feeders for hay and other roughage foods are usually quite extensive in height to a degree that they would obscure the animals to an objectionable degree were they mounted on the front wall of a cage.

In addition, the habits of chinchillas include frequent racing about the upper portions of the vertical walls of the cage, rendering a substantially uniform structure in this area highly desirable.

The cage of the present invention comprises side walls, end walls and horizontal walls defining an enclosure, partitions within the enclosure, intermediate certain of the walls and defining a chamber, means above the chamber defining a passage to portions of the enclosure beyond the chamber, and a perforate barrier interposed between a portion of the enclosure and the passage. The side walls are preferably a front side wall and a rear side wall, and the passage in such a case is defined through the front wall and adjacent one of the end walls. The chamber assumes the form of a nest box in the preferred embodiment, and a door carried by one of the partitions between the nest box and enclosure affords access between them when the door is opened by the attendant. Doors are also mounted on the front wall affording access to the chamber and enclosure. The perforate barrier interposed between a portion of the enclosure and the passage defines a feed rack adjacent the nest, and a floor in the rack is preferably downwardly inclined towards the barrier. The side walls and end walls are preferably vertical and interconnected with the horizontal walls, and the perforate barrier is likewise preferably vertical.

The perforate barrier preferably extends from the upper and rear edges of the nest to the side and horizontal walls, cooperating with the rear wall and one of the end walls to define the feed rack. The barrier is suitably defined by woven wire arranged substantially coplanar with one of the partitions, defining a feed rack accessible from the enclosure.

A more complete understanding of the invention will follow from a detailed description of the accompanying drawings wherein:

Fig. 2 is an elevation taken at the right end of Fig. 1;

Fig. 3 is an end elevation taken from the left end of Fig. 1;

Fig. 4 is a sectional elevation taken along line 4—4 of Fig. 1;

Fig. 6 is a sectional plan view taken along line 6—6 of Fig. 1.

Figure 1:
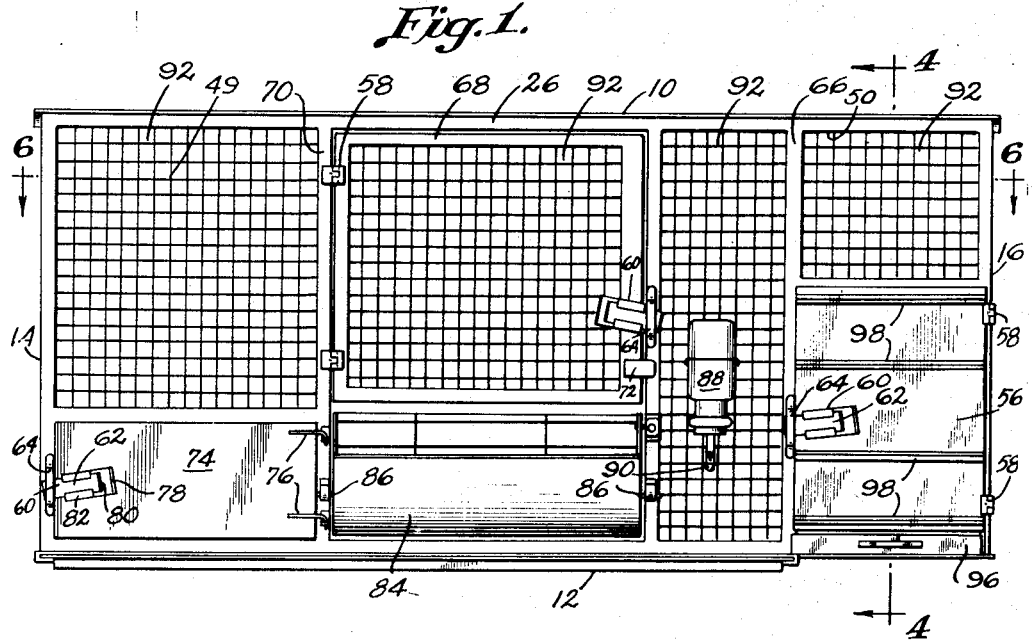
Fig. 1 is a front elevation of a cage embodying the present invention.

The cage depicted in the drawings comprises a top wall 10, a bottom wall 12, end walls 14 and 16, and side walls including a front wall 18 and rear wall 20. The cage is constructed from relatively light gauge sheet metal and woven wire, rigidified primarily by means of light-weight angles and other standard structural shapes.

Figure 5:
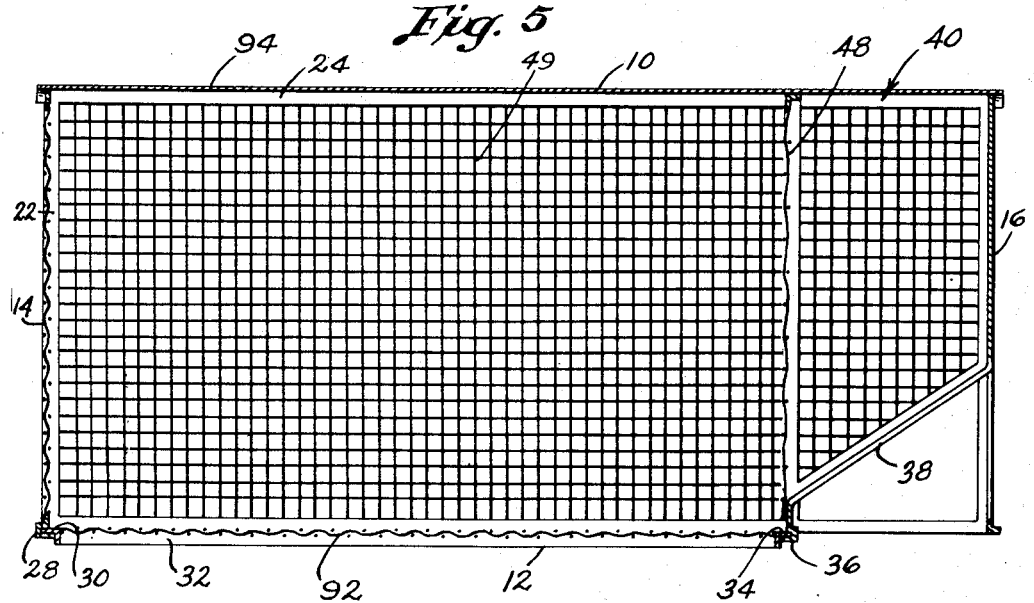
Fig. 5 is a sectional elevation taken along line 5—5 of Fig. 2.

As will be evident from Figs. 5 and 6 of the drawings, the corners formed at the left end of the cage are defined by vertical angles 22 secured at their upper ends to horizontal angles 24 extending from the front wall 18 to the rear wall 20, and horizontal members 26 extending between the ends 14 and 16. At their lower ends, the angles 22 are secured to a channel 28 containing a groove for the reception of a tongue 30 formed on the removable floor 32. A similar tongue 34 is formed at the opposite edge of the removable floor 32 and received by the groove of a channel 36 located at an intermediate portion of the bottom of the cage.

The end wall 16 at the right end of the cage is composed of sheet metal, which is folded at the lower rear portion of the cage to define an inclined floor 38 for a feed rack generally identified by reference character 40. A nest box or housing 42 is located forwardly of the feed rack 40, and lies between the end wall 16 of the cage and a solid partition 44 of sheet metal extending vertically to a point intermediate the height of the cage where it is secured to a sheet metal top wall 46. Substantially coplanar with the vertical wall 44 of the nest box, a rather open-mesh wire fabric 48 completely separates the principal enclosure 49 of the cage from the feed receptacle defined by hay rack 40 and the portion of the cage above the nest box 42. From this construction, it will be clear that hay or other roughage can be freely inserted through an opening 50 at the front of the cage immediately above the nest box and pushed rearwardly until it falls beyond the nest box into the feed rack 40, whose inclined floor 38 will cause the feed to move towards the open mesh screening 48 for availability to the animals.

A sliding door 52 is arranged on suitable tracks 54 to control access between the main portion of the cage and the nest box. The nest box is accessible from the front of the cage through a door 56 mounted on hinges 58 carried by the end wall 16, a latch 60 having a gravity biased bolt 62 cooperating with a keeper 64 carried by a frame member 66 extending from top to bottom at the front of the cage. An access door 68 is provided for the main enclosure of the cage, this door being likewise mounted on hinges 58 carried by a vertical frame member 70 extending from top to bottom on the front of the cage. A similar latch 60 and keeper 64 are provided for this door, and in addition, a stop 72 limits inward movement of the door and relieves unnecessary strain from the latch.

The lower left hand portion of the front of the cage is provided with a sand receptacle 74 having hinges 76 carried by the frame member 70 and a latch 62 and keeper 64 similar to those already described. In the case of each of these latches, it will be noted that stops 78 and 80 are formed on the latch frame and bolt respectively to prevent removal of the latter, and the intermediate portion of the latch frame is bent to provide guide wings 82 for the bolt and at the same time limit its projected position. The sand receptacle, as depicted in Fig. 6 assumes the form of a sector which can be swung through an arc sufficient for the attendant to have access to the entire area without completely removing the receptacle.

Adjacent the sand receptacle and also near the bottom of the cage, a feed trough 84 is provided, mounted on pivots 86 for pivotal movement about a horizontal axis. The external portion of the trough is made from sheet metal, the upper and internal portions thereof being primarily composed of relatively large mesh woven wire so that the animals will have ready access to the contents of the trough. Intermediate the feed trough and the nest box, a water bottle 88 is suitably suspended at a desired elevation on the front of the cage so that the animals will have the needed supply of drinking water which they obtain through a feed tube 90 extending from the bottle.

As will be clear from the drawings, the major portion of the main enclosure is formed from rather close mesh woven wire 92 stretched between and fastened to the various structural members constituting the rigid portions of the cage, similar wire being employed as the panel for the door 68 constituting the principal mode of access to the main enclosure. Similar woven wire 92 is used for the removable floor 32 which can be withdrawn from the cage structure for cleaning purposes. Since the floor is thus perforated, it is desirable that the top of the cage be formed from an imperforate sheet 94 so that when the cages are stacked, as it is intended they be, the droppings from one cage will not fall into one below. Woven wire 92 likewise constitutes the floor of the nest box 42, below which a removable tray 96 is provided for the ready removal of droppings from this portion of the cage.

For purposes of identification, the door 56 of the nest box has been provided with channels 98 for the reception of cards bearing information relating to the animals assigned to that particular cage. As clearly shown in Fig. 4 of the drawings, the sheet metal top 94 is bent downwardly along its rear edge to define a hook 100 which has been found to be particularly satisfactory for suspending the cage from cooperating wall or bracket fittings.

The assembly of the cage may be accomplished by usual methods known to workers in the art, including welding, soldering, bolting, or the like, and it is well within the scope of the invention that the cage be produced in a knocked-down condition for assembly at the point of use. By the same token, the cage can be completely assembled at its point of origin and shipped in condition for immediate use. From the construction as thus described, it will be clear that cages embodying this invention can be arranged in closely adjacent end to end relationship, and they can be mounted one above the other in a conventional battery arrangement without the loss of space usually encountered with existing constructions and without the loss of accessibility or convenience necessary to accomplish the breeding and raising of animals in accordance with best known practices.

Whereas only one embodiment of the invention has been described in detail, variations will occur to others just as they have occurred to the present inventor, and accordingly, the invention should not be limited to the form illustrated beyond the scope of the appended claims.

I claim:
1. A device for use with one substantially flat vertical side wall of a foraminous animal cage, said device comprising a housing having top, bottom and side walls, one side wall having a closable opening, an opposite side wall having a vertical and a lateral extension, a top and an end wall for said extension, said extension being provided with a floor inclined laterally to one side and providing a passage over said housing for the introduction of feed, whereby said device may be placed along one side wall of a cage to provide means for feeding animals.

2. A device for use with an animal cage having a foraminous side wall, said device comprising a housing having top, bottom, end and opposed side walls, one of said side walls containing an opening for communication with the cage, wall forming material disposed above and laterally beyond the other of said side walls defining a feed support extending over said housing and accessible above an end of said housing, said feed support having a floor inclined downwardly towards said foraminous side wall whereby feed introduced into said receptacle will gravitate towards said cage.

3. A device as set forth in claim 2 wherein said housing and support are integral with said cage.

4. A device as set forth in claim 2 wherein the top wall of said housing is substantially horizontal.

5. A device as set forth in claim 2 wherein the height of said support is greater than that of said housing.

6. A device as set forth in claim 2 wherein said inclined floor is disposed at least partially below the top wall of said housing.

7. A device as set forth in claim 2 wherein said housing provides a closure for said opening.

JOSEPH E. FORESTER.

References Cited in the file of this patent
UNITED STATES PATENTS

| Number | Name | Date |
|---|---|---|
| 1,051,784 | Trewhitt | Jan. 28, 1913 |
| 1,857,246 | Kleckner | May 10, 1932 |
| 1,869,901 | Le Fever | Aug. 2, 1932 |
| 1,973,952 | Goldberg | Sept. 18, 1934 |
| 1,974,867 | Hawkins | Sept. 25, 1934 |